Patented Sept. 7, 1937

2,092,494

UNITED STATES PATENT OFFICE 2,092,494

PURIFICATION OF ALPHA-HYDROXY-ALIPHATIC ACIDS

Shailer L. Bass, Midland, Mich., assignor to The Dow Chemical Company, Midland, Mich., a corporation of Michigan No Drawing. Application December 9, 1933, Serial No. 701,723

8 Claims. (Cl. 260—122)

This invention concerns an improved method of separating alpha-hydroxy-aliphatic acids from mixtures thereof with inorganic salts and/or organic impurities. It particularly concerns the separation of a substantially pure alpha-hydroxy-aliphatic acid from an aqueous solution comprising the reaction products obtained by hydrolyzing an alpha-halo-aliphatic acid with an aqueous alkali metal base.

Alpha-hydroxy-aliphatic acids, e. g., lactic acid, are ordinarily prepared either by hydrolyzing a corresponding alpha-halo-aliphatic acid, or by fermenting an aqueous solution of sugars or starch in the presence of an alkaline earth metal base, filtering off the crude hydroxy acid salt formed during such fermentation, and acidifying said salt to liberate the hydroxy acid. A hydroxy acid prepared by either method is usually contaminated with water-soluble inorganic salts and/or organic impurities. For instance, a solution of alkali metal lactate, prepared by hydrolyzing an alpha-halo-propionic acid with an aqueous alkali metal base, is usually contaminated with alkali metal halide, alkali metal salts of the unreacted alpha-halo-propionic acid and of acrylic acid, and anhydrides of lactic acid. Lactic acid prepared by a fermentation process is usually contaminated with alkaline earth metal salts, sugars, and volatile organic impurities such as acetic and butyric acids.

Lactic acid has previously been extracted from crude aqueous solutions thereof, containing inorganic and/or organic impurities such as those mentioned above, with ethyl or isopropyl ether, and the ether extract has in turn been extracted with water to obtain an aqueous solution of relatively pure lactic acid. This method is objectionable because:—(1) the extractions are never complete, with the result that some lactic acid is lost in the waste liquors, and (2) a large quantity of an expensive organic solvent must be employed.

I have now found that an alpha-hydroxy-aliphatic acid can be separated in good yield and in substantially pure form from a crude aqueous solution thereof, containing impurities of the type hereinbefore described by:—

(1) Steam distilling all volatile organic impurities from the hydroxy acid solution, (2) Adding a water-immiscible organic solvent and distilling a water-organic solvent mixture from the solution to leave a substantially anhydrous solution of the hydroxy acid in residual organic solvent, in which anhydrous solution any sugars or inorganic salts present are insoluble, (3) Removing the insoluble material from the anhydrous hydroxy acid solution, and (4) Separating the purified hydroxy acid from the organic solvent by usual procedure, e. g. extracting with water, distilling the solvent from the hydroxy acid, etc.

A neutral or alkaline solution must, of course, be acidified to liberate all organic acids contained therein prior to separating the hydroxy acid contained therein by the operations enumerated above.

In purifying a hydroxy acid by the procedure outlined above, it is preferable that the crude hydroxy acid be substantially free of alkaline earth metal halides, since the latter are precipitated, during removal of water from the mixture by the above step (2), in a form which occludes considerable of the hydroxy acid. The alkaline earth metal halide may, however, first be removed from the hydroxy acid by well known procedure, after which the hydroxy acid may be separated and purified by the procedure outlined above.

The invention, then, consists in the method of separating an alpha-hydroxy-aliphatic acid from inorganic and/or organic impurities hereinafter fully described and particularly pointed out in the claims, the following description and examples setting forth in detail only certain of the various ways in which the principle of the invention may be employed.

The following description illustrates my invention as applied to the separation of a substantially pure alpha-hydroxy-aliphatic acid from a crude aqueous solution thereof prepared by hydrolyzing an alpha-halo-aliphatic acid with an aqueous alkali metal base.

An alpha-halo-aliphatic acid, e. g. alpha-chloro-propionic acid, is hydrolyzed with an aqueous alkali metal base, e. g. sodium hydroxide, potassium hydroxide, or a corresponding carbonate, whereby is obtained a crude solution containing: alkali metal halide, an alpha-hydroxy-aliphatic acid corresponding to said halo-aliphatic acid, and organic impurities such as unreacted alpha-halo-aliphatic acid, anhydrides of the hydroxy acid, and unsaturated derivatives of said hydroxy acid. The organic acids are present, of course, in the form of their alkali metal salts.

The hydrolysis mixture is acidified with mineral acid, e. g. sulphuric or preferably hydrochloric acid, to liberate all organic acids contained therein. The organic impurities mentioned above are then steam distilled from the acidified liquor, preferably in such manner as to leave a concentrated aqueous solution of the hydroxy acid containing alkali metal salts. The steam distillation can usually be carried out satisfactorily at atmospheric pressure, but in some instances it may be necessary to carry such distillation out under vacuum at a relatively low temperature in order to avoid condensing a portion of the hydroxy acid into anhydrides thereof.

The concentrated hydroxy acid solution remaining after the steam distillation is treated with preferably from 3 to 6 times its volume of a water-immiscible organic solvent capable of dissolving the hydroxy acid. Water is distilled from the mixture, along with a portion of the organic solvent, to leave a substantially anhydrous solution of the hydroxy acid in residual organic solvent. During such distillation the organic solvent may be separated from the distillate and returned to the still. By removing the water from the impure hydroxy acid solution in the manner just described, the alkali metal salts present are precipitated and can be removed from the anhydrous hydroxy acid solution, e. g. by filtration.

Any of a wide variety of water-immiscible organic solvents may be employed in the above operation, among which are the water-immiscible aliphatic ethers and ketones, e. g. isopropyl ether, butyl ether, methyl-propyl ketone, diethyl ketone, methyl-isobutyl ketone, etc. It is convenient to employ a solvent boiling at between 50° and 150° C., preferably between 80° and 115° C., at atmospheric pressure, but solvents boiling outside this range can be used, though less advantageously. If a solvent boiling below 50° C. is used, the quantity of solvent which must be distilled in order to remove all water from the residual hydroxy acid solution is excessive. When a solvent boiling above 150° C. is employed, the distillation is preferably carried out under vacuum in order to avoid contamination and loss of hydroxy acid through by-product formation.

After removal of the alkali metal halide and organic impurities from the hydroxy acid, as described above, the latter is separated from the organic solvent by known procedure. For instance, the solvent may be distilled from the hydroxy acid to obtain the latter in pure anhydrous form, the distillation being preferably carried out under vacuum at a low temperature, e. g. below 50° C., in order to avoid decomposition or condensation of the hydroxy acid. If an aqueous solution of the hydroxy acid is desired, the acid can be extracted from the organic solvent with water.

The following examples illustrate several ways in which the principle of my invention has been applied, but are not to be construed as limiting the invention.

*Example 1*

An aqueous sodium lactate solution, prepared by heating 1 mol. of alpha-chloro-propionic acid with 2 mols of 2-normal sodium hydroxide solution, was treated with 1.11 mol. of 5-normal aqueous hydrochloric acid, whereby free lactic acid was liberated. The solution was steam distilled to remove organic impurities therefrom, the residual lactic acid solution being at the same time concentrated to a volume of approximately 200 cubic centimeters. The steam distillate was analyzed and found to contain 0.003 mol. of hydrochloric acid and 0.09 mol. of organic acids consisting largely of alpha-chloro-propionic acid, acrylic acid, and lactic acid. The residual lactic acid solution was treated with 500 cubic centimeters of isopropyl ether and a water-isopropyl ether mixture was distilled off. During the distillation, the ether layer of the distillate was separated and returned continuously to the distilling flask until all water was removed, leaving in said distilling flask solid sodium chloride and an anhydrous solution of lactic acid in isopropyl ether. The anhydrous mixture was filtered to obtain 2 mols, or the theoretical quantity, of sodium chloride. Lactic acid was extracted from the ethereal filtrate with water. The small quantity of isopropyl ether dissolved in the extract was vaporized therefrom, leaving an aqueous solution of pure lactic acid.

*Example 2*

An aqueous glycollic acid solution was prepared by hydrolyzing 1 mol. of chloroacetic acid with 2 mols of 2-normal aqueous sodium hydroxide and thereafter acidifying the liquor with 1.04 mol. of hydrochloric acid. Organic impurities, e. g. unreacted chloro-acetic acid, etc., were steam distilled from the glycollic acid solution and the latter was at the same time concentrated to a volume of approximately 200 cubic centimeters. The glycollic acid solution was then treated with 750 cubic centimeters of methyl-isobutyl ketone, and water was distilled from the mixture, by procedure similar to that described in Example 1, to leave in the distilling flask solid sodium chloride and an anhydrous solution of glycollic acid in methyl-isobutyl ketone. Said residual mixture was filtered, thereby separating 2.0 mols, or the theoretical quantity, of sodium chloride. The filtrate was extracted with water and traces of dissolved methyl-isobutyl ketone were steam distilled from the extract to leave an aqueous solution of pure glycollic acid.

*Example 3*

An alpha-hydroxy-butyric acid solution was prepared by hydrolyzing 1 mol. of alpha-chloro-butyric acid with 2 mols of 2-normal sodium hydroxide solution and thereafter acidifying the reacted liquor with 1.04 mols of hydrochloric acid. Organic impurities were steam distilled from the hydroxy-butyric acid solution and the latter was at the same time concentrated to a volume of approximately 250 cubic centimeters. The distillate was analyzed and found to contain 0.035 mol. of organic acids (i. e. alpha-chloro-butyric acid, crotonic acid, and alpha-hydroxy-butyric acid) and 0.086 mol. of hydrochloric acid. The hydroxy-butyric acid solution remaining after the steam distillation was treated with 750 cubic centimeters of methyl-isobutyl ketone, and water was distilled off, as described in Example 1, to leave in the distilling flask solid sodium chloride and an anhydrous solution of alpha-hydroxy-butyric acid in methyl-isobutyl ketone. Said mixture remaining after the distillation was filtered to separate 2 mols, or the theoretical quantity, of solid sodium chloride. Alpha-hydroxy-butyric acid was extracted from the filtrate with water, and traces of dissolved methyl-isobutyl ketone were distilled from the extract to leave an aqueous solution of substantially pure alpha-hydroxy-butyric acid.

*Example 4*

270 grams of a commercial aqueous lactic acid solution having the following composition, by weight:—

| Ingredient | Percent |
|---|---|
| H₂O | 30 (approx.). |
| Lactic acid | 67.8. |
| Chlorine (as chloride ion) | 0.07. |
| Ash | 1.09. |
| Ca | 0.37. |
| Reducing materials, i. e. sugars | Sufficient in 100 grams of solution to produce 4.60 grams of Cu₂O from a Fehling solution. | was treated with 500 grams of methyl-propyl-ketone, and 82 cubic centimeters of water was distilled from the mixture by procedure similar to that described in Example 1, leaving a substantially anhydrous solution of lactic acid in said ketone. During the distillation the solution darkened and insoluble materials collected on the walls of the distilling flask. The residual anhydrous lactic acid solution was filtered, lactic acid was extracted from the filtrate with 5 separate 100 cubic centimeter portions of water, and the aqueous extracts were combined. The aqueous lactic acid solution was decolorized with decolorizing carbon and then evaporated under vacuum until the residual solution weighed 209.5 grams. The lactic acid solution so obtained was analyzed and found to have the following composition, by weight:—

| Ingredient | Percent |
|---|---|
| H₂O | 38 (approx.). |
| Lactic acid | 61.5. |
| Chlorine (as chloride ion) | 0.07. |
| Ash | 0.4. |
| Ca | 0.002. |
| Reducing materials, i. e. sugars | None. |

Examples 1, 2, and 3, above, illustrate the purification of several alpha-hydroxy-aliphatic acids which are contaminated with alkali metal chlorides and various relatively volatile organic impurities. Example 4 illustrates the purification of an alpha-hydroxy-aliphatic acid which is contaminated with sugars and various inorganic impurities.

As hereinbefore mentioned, a crude alpha-hydroxy-aliphatic acid which is contaminated with an appreciable quantity of an alkaline earth metal halide, e. g. calcium chloride, calcium bromide, magnesium chloride, etc., cannot be purified satisfactorily by direct treatment in accordance with my method. However, the alkaline earth metal halide can first be removed, by known procedure, from the crude hydroxy acid, and the latter can then be purified satisfactorily by my method. For instance, the alkaline earth metal can be precipitated as its carbonate by treating the solution with alkali metal carbonate.

A crude hydroxy acid which is to be purified by my method should, of course, contain no salts, e. g. aluminum chloride, ferric chloride, etc., which when rendered anhydrous will react with the hydroxy acid to destroy the latter. The crude hydroxy acids prepared by usual manufacturing processes are not contaminated with such salts, but if such should be the case, the salts in question should be removed by known procedure, after which the hydroxy acid may be purified by my method.

Other modes of applying the principle of my invention may be employed instead of those explained, change being made as regards the method herein disclosed, provided that the step or steps stated by any of the following claims or the equivalent of such stated step or steps be employed.

I therefore particularly point out and distinctly claim as my invention:—

1. In a method of purifying an alpha-hydroxy-aliphatic-carboxylic acid, the steps which consist in treating an aqueous solution of said hydroxy acid with a water-immiscible organic solvent capable of dissolving the hydroxy acid, and distilling water and a portion of the organic solvent from the mixture to leave a substantially anhydrous solution of the hydroxy acid in residual organic solvent and insoluble impurities.

2. In a method of purifying an alpha-hydroxy-aliphatic-carboxylic acid, the steps which consist in treating an aqueous solution containing said hydroxy acid and an alkali metal halide, but which is substantially free of alkaline earth metal halides, with a water-immiscible organic solvent capable of dissolving the hydroxy acid and having a boiling point between about 50° and about 150° C. at atmospheric pressure, distilling water and a portion of the organic solvent from the mixture to leave a substantially anhydrous mixture of the alkali metal halide in solid form and the hydroxy acid dissolved in residual organic solvent, and removing the precipitated alkali metal halide from the substantially anhydrous hydroxy acid solution.

3. In a method of purifying an alpha-hydroxy-aliphatic-carboxylic acid which is contaminated with a relatively volatile organic impurity and an inorganic salt, but which is substantially free of alkaline earth metal halides, the steps which consist in steam distilling the relatively volatile organic impurity from the crude hydroxy acid to leave the latter as an aqueous solution thereof, treating the residual aqueous solution with a water-immiscible organic solvent capable of dissolving the hydroxy acid, and distilling water and a portion of the organic solvent from the mixture to leave a substantially anhydrous mixture of said inorganic salt in solid form and the hydroxy acid dissolved in residual organic solvent.

4. In a method of purifying an alpha-hydroxy-aliphatic-carboxylic acid which is contaminated with a relatively volatile organic impurity and an alkali metal halide, but which is substantially free of alkaline earth metal halides, the steps which consist in steam distilling the relatively volatile organic impurity from an aqueous solution of the impure hydroxy acid, treating the residual solution with a water-immiscible organic solvent capable of dissolving the hydroxy acid and having a boiling point between about 50° and about 150° C., distilling water and a portion of the organic solvent from the mixture to leave a substantially anhydrous mixture of the alkali metal halide in solid form and the hydroxy acid dissolved in residual organic solvent, removing the solid alkali metal halide from the hydroxy acid solution, and separating the hydroxy acid from the organic solvent.

5. The method of separating a substantially pure alpha-hydroxy-aliphatic-carboxylic acid from a crude aqueous solution thereof prepared by hydrolyzing an alpha-halo-aliphatic-carboxylic acid with an aqueous alkali metal base, which comprises acidifying the reacted liquor to liberate the hydroxy acid and other organic acids contained therein, steam distilling organic impurities from the hydroxy acid solution, treating the residual solution with a water-immiscible organic solvent capable of dissolving the hydroxy acid and having a boiling point between about 50° and about 150° C. at atmospheric pressure, distilling water and a portion of the organic solvent from the mixture to leave a substantially anhydrous mixture of alkali metal salts in solid form and the hydroxy acid dissolved in residual organic solvent, removing the solid salts from the hydroxy acid solution, and extracting the hydroxy acid from the organic solvent with water to obtain an aqueous solution of the substantially pure hydroxy acid.

6. The method of separating substantially pure glycollic acid from a crude aqueous solution thereof prepared by hydrolyzing mono-chloro-acetic acid with an aqueous alkali metal base, which comprises acidifying the hydrolysis mixture to liberate the glycollic and other organic acids contained therein, steam distilling organic impurities from the glycollic acid solution, treating the residual solution with a water-immiscible organic solvent selected from the class consisting af aliphatic ethers and aliphatic ketones having boiling points between about 80° and about 115° C. at atmospheric pressure, distilling water and a portion of the organic solvent from the mixture to leave a substantially anhydrous mixture of alkali metal salts in solid form and glycollic acid dissolved in residual organic solvent, removing the solid salts from the glycollic acid solution, and extracting glycollic acid from the organic solvent with water to obtain an aqueous solution of substantially pure glycollic acid.

7. The method of separating substantially pure lactic acid from a crude aqueous solution thereof prepared by hydrolyzing mono-chloro-propionic acid with an aqueous alkali metal base, which comprises acidifying the hydrolysis mixture to liberate the lactic and other organic acids contained therein, steam distilling organic impurities from the lactic acid solution, treating the residual solution with a water-immiscible organic solvent selected from the class consisting of aliphatic ethers and aliphatic ketones having boiling points between about 80° and about 115° C. at atmospheric pressure, distilling water and a portion of the organic solvent from the mixture to leave a substantially anhydrous mixture of alkali metal salts in solid form and lactic acid dissolved in residual organic solvent, removing the solid salts from the lactic acid solution, and extracting lactic acid from the organic solvent with water to obtain an aqueous solution of substantially pure lactic acid.

8. The method of separating substantially pure alpha-hydroxy-butyric acid from a crude aqueous solution thereof prepared by hydrolyzing mono-chloro-butyric acid with an aqueous alkali metal base, which comprises acidifying the hydrolysis mixture to liberate the alpha-hydroxy-butyric acid and other organic acids contained therein, steam distilling organic impurities from the alpha-hydroxy-butyric acid solution, treating the residual solution with a water-immiscible organic solvent selected from the class consisting of aliphatic ethers and aliphatic ketones having boiling points between about 80° and about 115° C. at atmospheric pressure, distilling water and a portion of the organic solvent from the mixture to leave a substantially anhydrous mixture of alkali metal salts in solid form and alpha-hydroxy-butyric acid dissolved in residual organic solvent, removing the solid salts from the alpha-hydroxy-butyric acid solution, and extracting alpha-hydroxy-butyric acid from the organic solvent with water to obtain an aqueous solution of substantially pure alpha-hydroxy-butyric acid.

SHAILER L. BASS.